Dec. 22, 1942.  W. F. GROENE ET AL  2,305,868
WORK HANDLING DEVICE
Filed Aug. 30, 1940   4 Sheets-Sheet 4
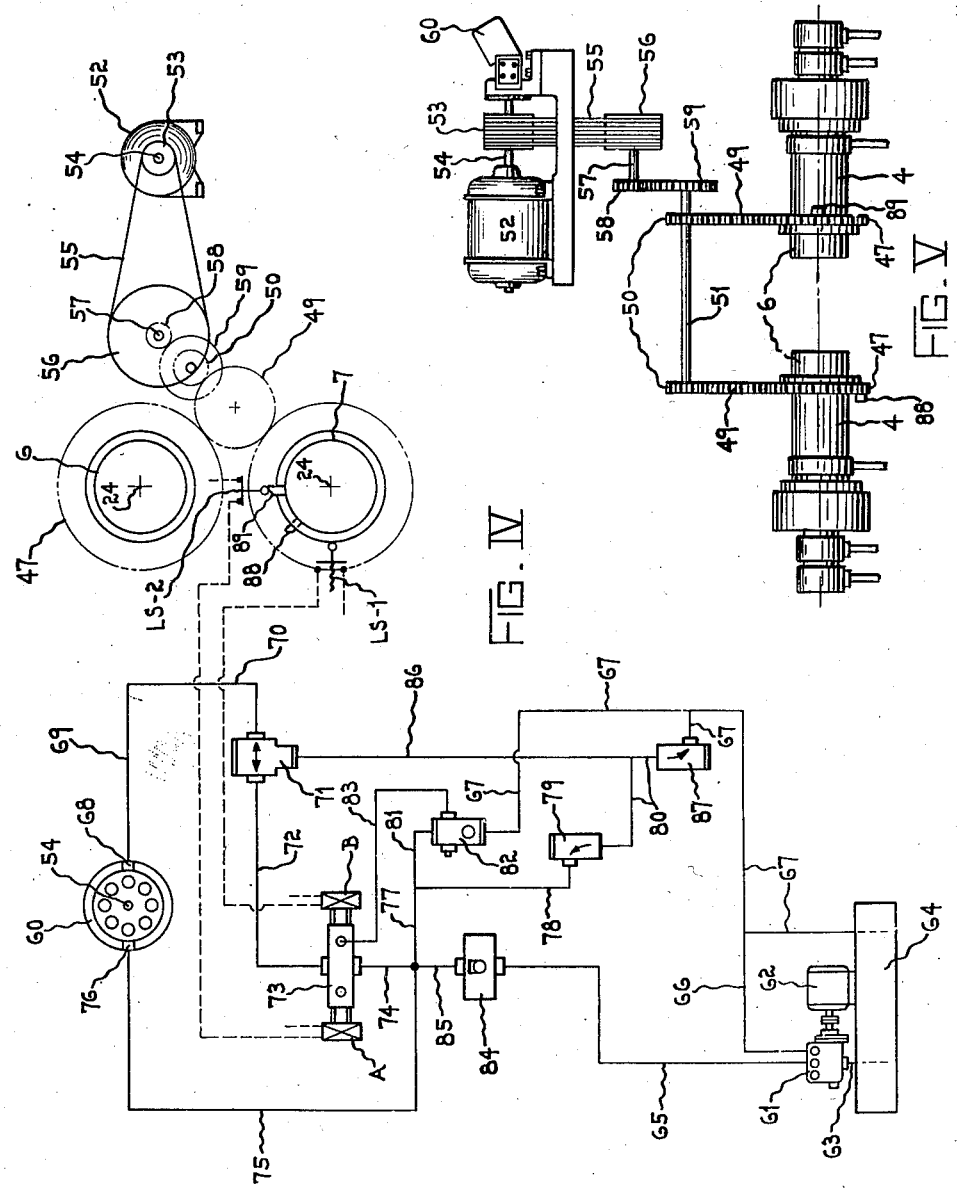
INVENTORS.
WILLIAM F. GROENE
HAROLD J. SIEKMANN
BY Patented Dec. 22, 1942

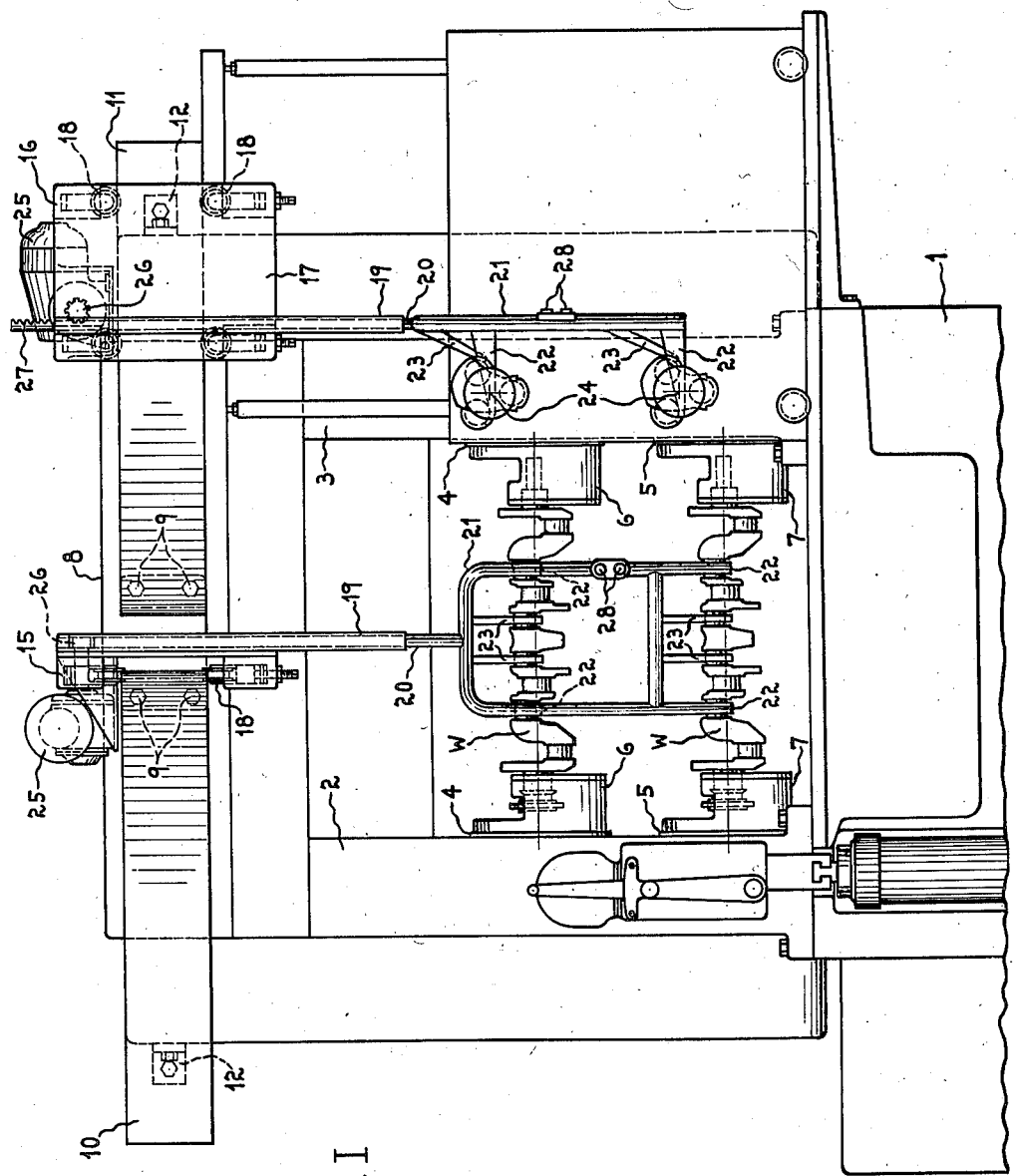

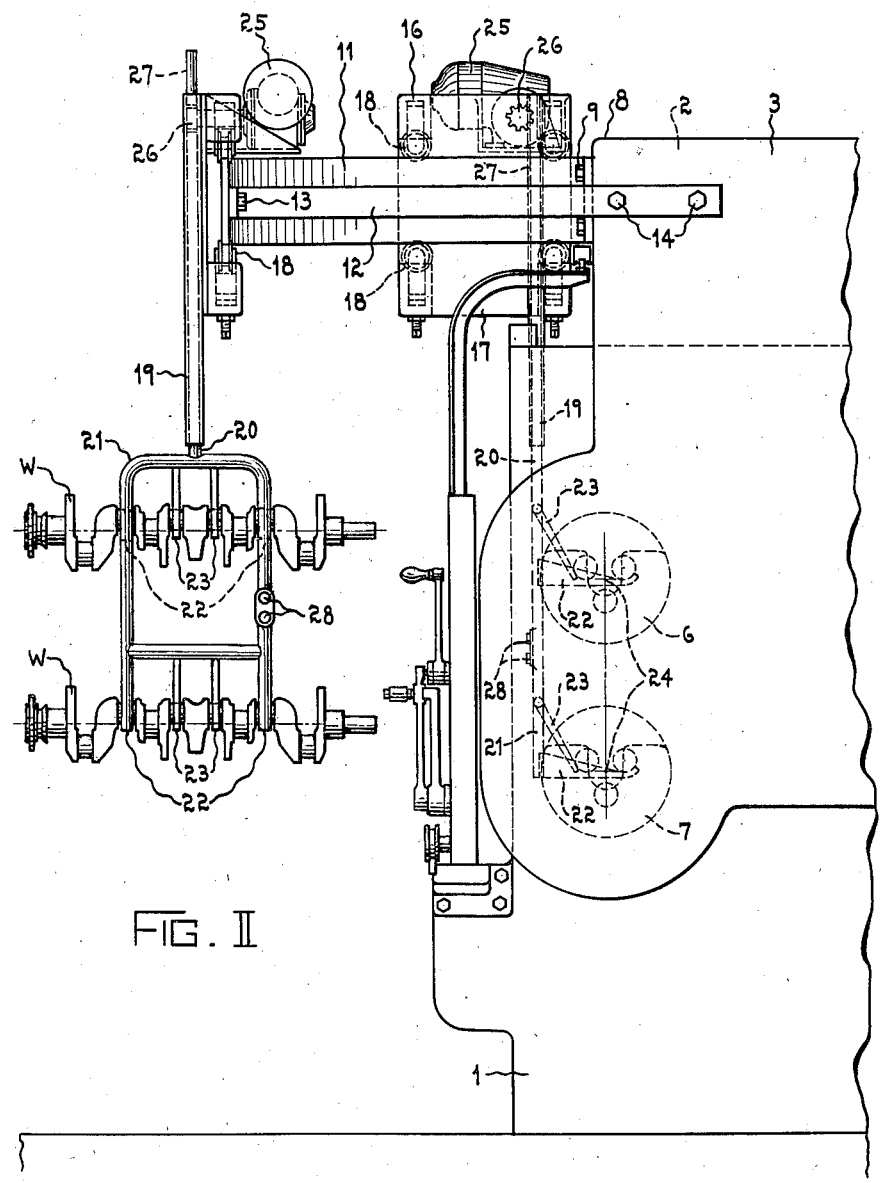

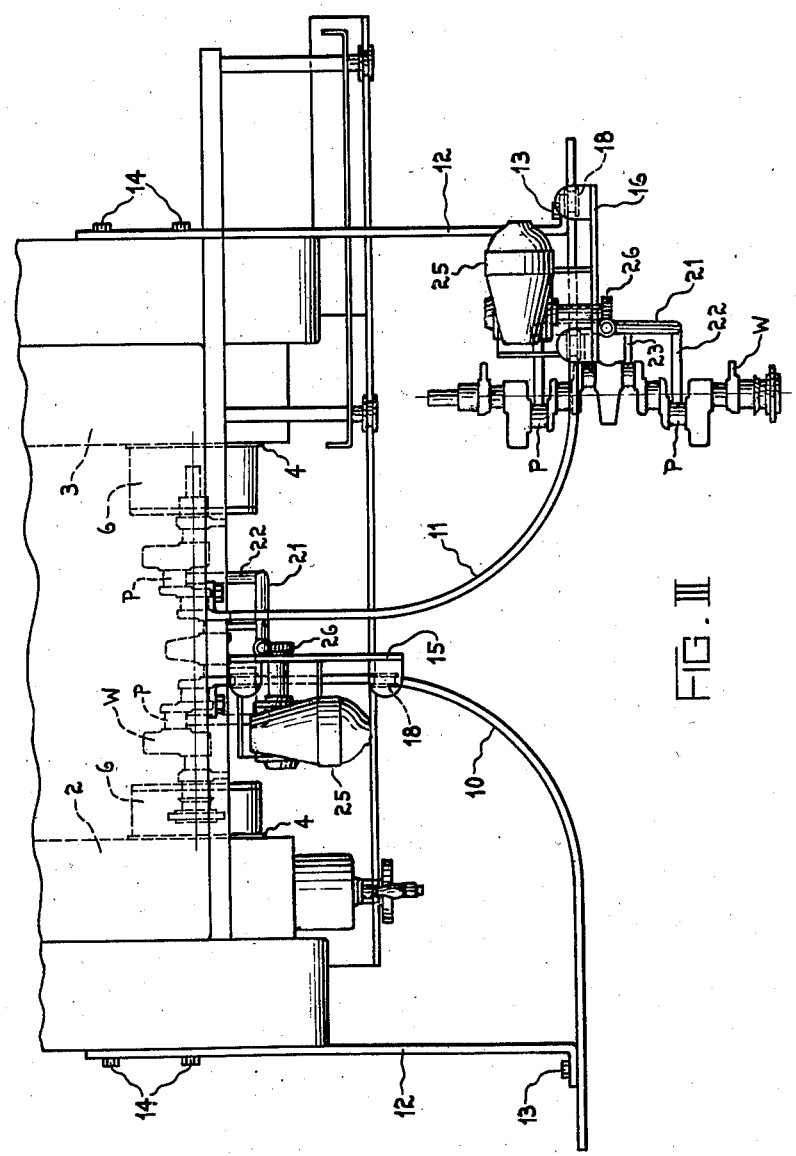

2,305,868

UNITED STATES PATENT OFFICE 2,305,868

WORK HANDLING DEVICE

William F. Groene and Harold J. Siekmann, Cincinnati, Ohio, assignors to The R. K. Le Blond Machine Tool Company, Cincinnati, Ohio, a corporation of Delaware Application August 30, 1940, Serial No. 354,870

6 Claims. (Cl. 212—135)

This invention pertains to work handling mechanism, particularly to work handling devices for use in loading work pieces into and out of multiple spindle machine tools. More especially this invention is adapted to the loading and unloading of crankshafts in multiple spindle orbital lathes, for example, of a type shown in Patents #1,934,530, 1,993,994, 1,993,995, 2,089,421, and 2,138,964. This invention involves certain specific improvements in such type loading devices for multiple spindle orbital crank pin turning lathes over that of Patent 2,233,993, issued March 4, 1941, in that the work crankshafts are held in a rigid manner while being moved into or removed from the work spindles of the lathe.

One of the chief objects of this invention is to provide a loading device having a work carrying frame in which a plurality of work pieces may be carried in a definite relationship to each other with respect to their axial spacing and their indexed relationship and which carries these work pieces in a specific relationship to the work spindles of the lathe into which they are to be simultaneously loaded or unloaded. It is then the object of this invention to move this frame carrying these work pieces, while held rigidly, to a position for depositing into the chucking devices or removal from the chucking devices without assistance or guiding of any kind on the part of the operator of the loading device.

Another object of this invention is to provide a loading device for a multiple spindle crank pin lathe in which a plurality of crankshafts are carried on a rigid supporting frame in a definite relationship to each other and to the work spindles of the multiple spindle lathe and to provide a crane device which can raise and lower these work pieces simultaneously into or out of the chucking devices and to provide a traveling crane device carrying this work handling frame in a rigid manner to and from the work spindle depositing or removing position without assistance or guiding of any kind upon the part of the operator save to move the loading device into loading and unloading position in the lathe or to move the loading device back out to position for removal of the finished work and depositing of new work on the crane.

A further object of this invention is to provide a loading arrangement for a multiple spindle crankshaft lathe in which a plurality of crankshafts are carried in a rigid manner to and from work loading position and in which there are a pair of such loading devices, one adapted to deposit the work into the chuck on the work spindles and the other adapted to simultaneously unload the plurality of crankshafts from the work spindles of the machine tool.

Further features and advantages of this invention will appear from the detailed description of the drawings in which:

Figure I is a front elevation of a multiple spindle crankshaft lathe showing one of the loading cranes in position for removal of work from the chucking devices on the work spindles of the lathe while the other crane has the unfinished work pieces ready to be moved into position for depositing them in the work spindles.

Figure II is a right hand end elevation of the loading device applied to the crankshaft lathe of Figure I.

Figure III is a plan view showing both of the loading devices applied to the multiple spindle crank pin lathe of the Figures II and III.

Fig. IV shows in diagram form the braking motor, the hydraulic system through which the braking is accomplished, and the spindle drive motor.

Fig. V is a detail of the motor drive for the spindles.

For purposes of an exemplary disclosure, this novel work handling device is shown applied to a typical two spindle orbital lathe of a character shown in the above mentioned patents which has the base 1 upon which are mounted the housings 2 and 3 in which are journaled the work spindles 4 and 5. The respective pot chucks 6 and 7 of a character shown for example in patent Re. 19,730 are mounted on said spindles. Suitably mounted on the upper portions 8 of the machine frame by appropriate screws 9 are the crane rails 10 and 11 which are steadied at their outer ends by suitable supporting bars 12 connected thereto by means of screws 13 and mounted on the side frames 2 and 3 of the machine by appropriate screws 14, so as to rigidly support these rails 10 and 11 in a predetermined fixed position relative to the work spindles 4 and 5 of the machine. On each of these rails 10 and 11, are transportably mounted the loading cranes indicated generally at 15 and 16, each crane of which comprises a plate 17 having appropriate rollers 18 which roll on the rails 10 and 11 in a rigid manner so that there will be no relative movement of the plate 17 with respect to the rails except that which is provided by the direction of rolling of the rollers 18 along these rails.

Fixed on each of these plates integrally therewith, is the vertical guide tube 19, in which is slidably mounted the raising and lowering bar 20 to which is connected the work carrying frame 21 having appropriate work engaging hooks 22 and 23 for engaging the crank pins P of a pair of work crankshafts W in such a way as to hold them in a definite indexed relationship to each other and in a definite axial spacing between their axis 24, as best seen in Figure I.

The bar 20 is mounted against any movement or rotation in the tubular guide member 19 except that of vertical reciprocation therein, which is affected by means of a suitable gear reduction motor or equivalent 25 having appropriate gearing 26 which engages the rack portion 27 on the bar member 20, whereby applying appropriate power to the motor 25 will affect the raising and lowering of the frame member 21 when lifting work out of the chucking devices or when depositing work into said chucking devices when the frame is moved into position over the work spindles as best seen in Figure II. Appropriate control push buttons 28 are provided on the frame 21 for actuating the respective lifting motors 25 for convenient operation of the device by the operator.

Noting particularly Figure III, the operation of the device is substantially as follows:

Assuming that the work pieces W in the chucking devices 6 and 7 have just been completed, the crane 15 is rolled from the left in Figure III along its rail 10 into the position shown, while the motor 25 has been so actuated to move the frame 21 at this time to the lower position, whereby the respective hooks 22 and 23 may be positioned under the crankshafts W in the chucking devices. The push buttons 28 are then appropriately actuated whereby the crankshafts are simultaneously lifted upwardly out of the chucking devices of the machine and raised up while being held rigidly by the crane device. As soon as this operation has been accomplished, the crane is then free to be rolled outwardly around the arcuate track 10 to a position assumed by the crane 16 but at the left hand side of the machine.

The crane 16 which has been previously loaded with rough unmachined crankshafts is now ready to be rolled into the work spindle position, during which movement the motor 25 of this loading crane 16 is so energized as to be holding the frame 21 in the upper position shown in Figure I. As soon as the crane has been brought into position previously occupied by the crane 15, the motor 25 of the crane 16 is again actuated to lower the two crankshafts simultaneously into the chucking devices ready for gripping them by means of the chucking devices. The crane is then rolled outwardly and the machining operation again started, during which machining period, the previously finished crankshafts are unloaded from the left hand crane 15 while new unmachined crankshafts are loaded on the loading device 16, ready for repeating the cycle just described.

We thus have in this device, a means whereby the very minimum of productive time is utilized in loading and unloading the crankshafts from the lathe and it will also be noted that in this device, no guiding or careful nicety of handling of the crane by the operator is at all required, the entire mechanism operating to automatically position and load and unload the crankshafts in proper relationship to the work spindle without any effort or careful guiding on the part of the operator. We also have devised herewith, a loading device which is capable of supporting a plurality of crankshafts rigidly while loading and unloading them in a plurality of work spindles simultaneously and we have also provided an arrangement of loading a plurality of crankshafts in a definite relationship to each other and to the work spindles into which they are to be loaded while they are held rigidly without assistance on the part of the operator in position for loading and unloading a plurality of work pieces with respect to a plurality of work spindles simultaneously.

In order to facilitate the simultaneous loading and unloading of the crankshafts W into the respective chucks 6 and 7, it is desirable to provide the usual means for manually inching the work spindles to appropriate position, in this instance with their openings extending upwardly as seen best in Figure II, manually operated push button control mechanism commonly used for such purposes, or it may be desirable to use the automatic spindle stopping and indexing mechanism, for example, as shown in Patent #2,192,437 of William F. Groene, et al., dated March 5, 1940, in which the work spindles may be automatically stopped in the predetermined indexed position for the easy depositing of the crankshafts into or removing them out of the chucking devices most efficiently.

The spindle driving arrangement, shown diagrammatically in Figures IV and V, for the work spindles 4 and 5 consists of gears 47 and 48 mounted on these spindles which are driven through suitable idler gears 49 by the pinions 50 fixed on the drive shaft 51.

The drive shaft 51 is driven by the main drive electric motor 52 which has a pulley 53 mounted on its motor shaft 54 connected by suitable belts 55 to the driving pulley 56 mounted on the pulley shaft 57 upon which shaft is fixed the driving pinion 58 which drives the gear 59 fixed on the drive shaft 51 whereby the motor 52 may rotate spindles 4 and 5. Also connected to the shaft 54 is the hydraulic braking motor 60 which may be of the usual gear pump or piston pump type.

The supply of fluid pressure for the hydraulic control system may be derived from the usual hydraulic fluid pressure pump 61 driven by an electric motor 62 which draws fluid through the suction line 63 from the fluid reservoir 64 and delivers fluid under pressure through the pressure line 65. Drainage from a relief valve in the pump 61 for maintaining pressure in the line 65 is exhausted through the line 66 into the drain line 67 which returns fluid to the reservoir 64.

In the operation of the lathe when the main drive motor 52 is operating driving the work spindles 4 and 5 during the cutting operation, the hydraulic braking motor 60 is also being driven by the motor shaft 54. Under these conditions fluid is discharged from the exhaust port 68 of the braking motor 60 through the lines 69 and 70, passes freely through the relief valve 71, through the line 72, the solenoid operated control valve 73, which is normally spring set in neutral position at this time, into the line 74, and then through the line 75 back to the intake port 76 of the braking motor 60 to form a closed circuit for free circulation of fluid at large volume when the electric motor 52 is running at full speed offering no resistance to the rotation of the braking motor 60. Fluid from this closed circuit may not escape through the line 77 and 78 because of the check valve 79 which only permits flow of fluid from the line 80 to the line 78. Nor may fluid escape through the line 81 from line 77 since this latter line is at all times closed off at the control valve 82 and serves only to supply fluid pressure for opening the valve 82 to connect line 83 to the drain line 67, which connection is normally cut off by the spring set arrangement in the valve when the pressure drops in the line 81.

High pressure is maintained in the closed circulating circuit by pressure received from the pressure line 65 which passes through the speed control valve 84 which in turn discharges the high pressure fluid into the line 85 connected to said circuit at a definite relatively small volume for at all times maintaining the high pressure in the circuit and to make up for any leakage from said circuit. This discharge from the valve 84 is also utilized to rotate the hydraulic braking motor 60 at a definite slow speed for driving the electric motor 52 and the lathe spindles 4 and 5 at slow speed preparatory to stopping said spindles or when jogging the spindles as will be described. The relief valve 71, while at all times allows free flow between the lines 70 and 72, is so set at a pressure higher than that of the relief valve in the pump 61, or in other words than the pressure in the closed circuit, that fluid does not escape under these conditions through the by-pass line 86, line 80, the check valve 87 and into the drain line 67.

Immediately upon disconnecting the electrical power from the motor 52 the otherwise inoperative limit switch LS1 associated with the work spindle 4 becomes effective through the usual relays and contactors (not shown) and is engaged by a dog 88 on the spindle to cause the solenoid B of the control valve 73 to be energized, operating the valve 73 so as to close off the line 74 and to connect line 72 to line 83. This causes the pressure to drop to substantially zero in the lines 75, 77, 78, and 81 because the intake volume through the port 76 of the braking motor 60, which is being driven at a high rate of speed by the momentum of the electric motor 52 and the associated driving transmission and work spindle, is far in excess of that which can be supplied by the valve 84 through the line 85. Dropping the pressure in the line 81 causes the valve 82 to operate by its spring to close off the line 83 thus preventing fluid from passing through the line 72. Extremely high pressure is momentarily built up in lines 69 and 70 until the momentum in the electric motor and spindle transmission is absorbed by bypassing fluid through the high pressure relief valve 71 into the line 86. The discharge through the line 86 passes through the line 80, through the check valve 79, and into the line 78 due to the suction action set up in the lines 78, 77 and 75 by the rapid intake of the hydraulic braking motor. The check valve 87, which is arranged to prevent flow from drain line 67 to line 80, maintains the suction action through the check valve 79.

The hydraulic braking motor 60 will continue to decelerate in bypassing fluid through the valve 71 until it has slowed down to a point where the volume taken into the intake port 76 is equal to that being supplied through the line 85 from the valve 84. The valve 71 is so set as to effect the deceleration in about a half revolution of the work spindle. After the hydraulic braking motor 60 has decelerated to the above point pressure again builds up in the lines 75, 77, 78, and 81 and the motor 60 is driven at a relatively slow speed for similarly rotating the work spindle by fluid from the line 85. Building up pressure in the line 81 again opens the valve 82 connecting line 83 to the drain line 67, allowing free flow of fluid through line 72 thus eliminating all back pressure at the exhaust port 68 of the hydraulic braking motor 60 which would otherwise hinder the operation of said motor 60 at the predetermined slow speed.

As soon as the limit switch LS1 is operated the otherwise inoperative limit switch LS2 is then rendered in a condition to be effective when operated. The limit switch LS2 is operated when the dog 89 carried on the spindle 4 engages it as it is rotated at the predetermined slow speed by the hydraulic braking motor 60. Operation of the limit switch LS2, through appropriate relays and contactors (not shown), causes the solenoid A of the control valve 73 to be operated which closes off the line 72 and connects the line 74 to the line 83. Flow through line 72 is thus stopped causing back pressure to substantially instantly build up in line 69 and 70 to stop rotation of the hydraulic braking motor, and thus stop the work spindle center drive ring gears in a predetermined position depending on the setting of the dog 89 on the spindle, from its slow rotating speed since the relief valve 71 is set at a greater pressure than that supplied to the port 76 of the motor 60 by the line 85. Substantially no fluid would escape through the line 86 from the valve 71 under these conditions, thus providing very accurate stopping of the spindles and the chuck in accurate predetermined indexed position. The valve 82 under these conditions will merely float on the line 83 since the control pressure in the line 81 will be determined by spring pressure setting of the valve 37.

When the main drive electric motor is again supplied with current solenoid A is de-energized and the valve 73 allowed to come to its spring set neutral position and both limit switches LS1 and LS2 are rendered ineffective by the usual electrical relays and contactors (not shown) so that the machine is then ready for repeating the above cycle of operation.

When it is desired to jog the work spindles 4 and 5 is it is only necessary to provide suitable electrical means for cutting out the limit switches LS1 and LS2 and to alternately energize one of the other of the solenoids A and B of the control valve 73. When the solenoid B is energized the work spindles rotate at a predetermined slow speed and when solenoid A is energized the center drive gears are substantially instantly stopped as described above.

We thus have an arrangement in which the crankshafts on the loading device are indexed with respect to each other and also with respect to the work spindles which have been previously stopped in predetermined position by any suitable conventional means commonly used for such purposes.

Having thus fully set forth and described our invention, what we claim as new and desire to secure by United States Letters Patent is:

1. In a work handling device for machine tools, a horizontally extending rail rigidly mounted with respect to said machine tool, a crane arranged to move on said rail and held in rigid position thereon while permitting its horizontal motion on said rail, a work engaging member mounted on said crane for movement in a vertical direction while rigidly supporting a work piece from any other relative movement with respect to said crane, and power means mounted on said crane and traveling therewith on said rail connected to said work engaging member for effecting vertical reciprocation thereof.

2. In a work handling device for machine tools, a horizontally extending rail rigidly mounted with respect to said machine tool, a crane movable horizontally on said rail, means associated with said crane and rail to effect rigid supporting of said crane on said rail, a vertically reciprocatable work engaging hook on said crane, means preventing any movement in said hook relative to said crane except said vertical reciprocatory motion thereof, and means on said crane for effecting said vertical reciprocation of said work engaging hook, and control means associated with said hook operable to render said power means on said crane effective to reciprocate said hook.

3. In a loading crane for machine tools, a rail rigidly mounted with respect to said machine tool, a truck movable on said rail in a horizontal direction, means associated with said truck and rail to otherwise rigidly confine said truck against any movement other than said horizontal movement, a work engaging member comprising a hook adapted to engage a work piece to be loaded or unloaded in a machine tool, said hook being mounted on said truck to permit vertical reciprocation thereof, means associated with said hook and truck to prevent any other movement of said hook relative to said truck, and power means on said truck connected to said hook to effect vertical reciprocation of said work engaging hook.

4. In a work handling device for machine tools, a pair of arcuate horizontally disposed rails rigidly mounted with respect to said machine tool, a loading crane on each rail comprising a truck movable horizontally on each of said rails having means for confining said truck in rigid condition on said rails, a work carrying member mounted rigidly on said truck having a vertical reciprocatory movement thereon, and power means on said truck connected to said work engaging member to effect vertical reciprocation thereof.

5. In a work handling device for machine tools, a pair of arcuate horizontally disposed rails, a loading crane on each rail comprising a truck movable horizontally on each of said rails having means for confining said truck in rigid condition on said rails, a work carrying member mounted rigidly on said truck having a vertical reciprocatory movement thereon, and power means on said truck connected to said work engaging member to effect vertical reciprocation thereof, each of said rails having a 90 degree arcuate curvature and parallel portions at each of their ends, whereby work placed on said work holder will be moved through a 90 degree arc of movement in a horizontal plane for each loading crane.

6. In a work handling mechanism for a machine tool, a pair of 90 degree arcuate rails mounted on the frame of a machine tool having its outer ends lying in a vertical plane parallel with the front or working position of said machine tool and having its inner ends connected to said frame and having portions parallel and closely associated with each other and lying perpendicular to said first mentioned plane, a loading crane on each of said rails each comprising a truck movable on said rails in a horizontal direction and rigidly held against any other movement relative to said rails, a work engaging and carrying member vertically reciprocatably mounted on said truck but restricted from any other movements relative thereto, and power means on said truck for vertically reciprocating said work engaging member, said rails being so arranged to permit one or the other of said cranes to be moved from a position with a work piece projecting perpendicular to the front face of the machine tool to a position parallel thereto as work is moved to the inner ends of said rails for loading it therein.

WILLIAM F. GROENE.
HAROLD J. SIEKMANN.